United States Patent Office

3,082,265
Patented Mar. 19, 1963

3,082,265
POLYMERIZATION OF OLEFINIC HYDROCARBONS
Joseph T. Arrigo, Broadview, Ill., assignor to Universal Oil Products Company, Des Plaines, Ill., a corporation of Delaware
No Drawing. Filed Nov. 12, 1959, Ser. No. 852,176
8 Claims. (Cl. 260—666)

This invention relates to a process for the polymerization of olefinic hydrocarbons and particularly to a method for polymerizing monoolefinic hydrocarbons in the presence of an anionic catalyst. More particularly the invention is concerned with a process for the polymerization of monoolefinic hydrocarbons to form liquid polymers thereof.

With the increased use of automobiles both for commercial and pleasure purposes the need for lubricating oils has also increased. It has been found that a lube oil with the desired character should consist of long aliphatic chains containing one or two short side chains. Heretofore, it has been established that condensed polycyclic naphthenes usually occur in certain lube oils in significant amounts and that these components of lube oil have an adverse effect on the viscosity index thereof. In addition it has also been assumed that these multi-ring cycloparaffins are the percusors of carbon deposits in cylindrical ring grooves of gasoline and diesel engines. Therefore, these adverse components of lube oils must be removed prior to use thereof in order to increase viscosity index of the oil, and to decrease carbon and sludge formation caused by these components. Other deleterious components of lube oils comprise certain waxes which prevent the desired lubrication of the engine at low temperatures due to their relatively high melting points. It is therefore imperative that these lube oils must be improved by both aromatizing the multi-ring naphthenes and absorbing the aromatics thus formed by a compound such as silica gel, and by dewaxing the lube oil using well known solvents.

It is therefore desirable to obtain lube oils which are free of naphthenic hydrocarbons and comprise mainly paraffinic hydrocarbons having a viscosity index of at least 125. However, it is relatively impossible to obtain these oils by the usual extractive methods. It has now been discovered that olefinic hydrocarbons and particularly monoolefinic hydrocarbons such as ethylene, propylene, etc., may be polymerized in the presence of an anionic catalyst to form liquid polymers which contain the desired characteristics of a good lube oil, that is, having a boiling range of from about 300° to about 500° C., a viscosity index of about 125 and a molecular weight of from about 400 to about 500.

In the usual processes for side-chain alkylation of alkylbenzenes in the presence of anionic catalysts, olefin polymerization is a minor, usually negligible, side reaction. Thus, cumene and excess ethylene in the presence of sodium hydride-anthracene catalyst at 250° C. and 119 atmospheres maximum pressure yielded above 70% of t-pentylbenzene (based on cumene charged) and a negligible amount of higher boiling liquid product. It has now been unexpectedly found that by increasing the temperature to about 300° C. and increasing the pressures to a maximum range of 200–500 atmospheres, and effecting the reaction in a solvent containing at least one benzylic hydrogen atom in the presence of an anionic catalyst, ethylene polymerization is the chief reaction, good yields of polymer being obtained, while only 3–8% of t-pentylbenzene is formed. The majority of the liquid polymer boils in the lube oil range and only minor amounts of wax are obtained.

The aromatic solvents used actually may have two functions They dissolve substantial amounts of the olefinic reactant, particularly advantageous in the case of gaseous olefins such as ethylene, for example, thereby increasing olefin concentration and allowing enhanced interaction with the suspended, agitated catalyst. By virtue of their benzylic hydrogens, as in the case of cumene, for example, chain termination is apparently quite facile in the presence of alkylbenzenes and related aromatics, thereby decreasing the number of chains that grow to the wax stage and increasing the lube oil-range polymer. It is well known that active benzylic hydrogens such as those found in cumene, for example, are readily abstracted as protons by strong bases such as alkyl carbanions.

It has further been found that when ethylene is polymerized in the absence of any added anionic catalyst in the same batch equipment as used above, the polymer produced by this thermally-induced free radical reaction contains relatively less liquid boiling in the lube oil range. This liquid fraction from a number of runs proved consistently to have a viscosity index in the range of 90–110, substantially lower than that of the anionic-catalyzed polymerization product.

It is therefore an object of this invention to provide a process for polymerizing olefinic hydrocarbons to liquid polymers.

A further object of this invention is to provide a process for the polymerization of monoolefinic hydrocarbons to form liquid polymers which are especially suited for use as lubricating oils.

One embodiment of this invention resides in a process for the polymerization of an olefinic hydrocarbon which comprises treating said hydrocarbons in an aromatic hydrocarbon solvent containing at least one benzylic hydrogen atom per molecule, in the presence of an anionic catalyst at a temperature in the range of from about 250° to about 350° C. and at a pressure in the range of from about 65 to about 500 atmospheres.

A further embodiment of this invention is found in a process for the polymerization of an olefinic hydrocarbon which comprises treating said hydrocarbon in an aromatic hydrocarbon solvent containing at least one benzylic hydrogen atom per molecule, in the presence of an anionic catalyst comprising sodium hydride and an organic promoter at a temperature in the range of from about 250° to about 350° C. and at a pressure in the range of from about 65 to about 500 atmospheres.

Yet another embodiment of the invention is found in a process for the polymerization of ethylene which comprises treating said ethylene in an aromatic hydrocarbon solvent containing at least one benzylic hydrogen atom per molecule, in the presence of an anionic catalyst comprising an alkali metal hydride and an organic promoter at a temperature in the range of from about 250° to about 350° C. and at a pressure in the range of from about 200 to about 500 atmospheres.

A specific embodiment of the invention is found in a process for the polymerization of ethylene which comprises treating said ethylene in cumene in the presence of an anionic catalyst comprising sodium hydride and anthracene at a temperature in the range of from about 250° to about 350° C. and at a pressure in the range of from about 200 to about 500 atmospheres.

Other objects and embodiments referring to alternative hydrocarbons, alternative alkali metal hydrides and organic promoters, and to alternative organic solvents will be found in the following further detailed description of this invention.

As hereinbefore stated it has now been found that monoolefinic hydrocarbons can be polymerized by treating said hydrocarbons in an aromatic hydrocarbon solvent containing at least one benzylic hydrogen atom per molecule, in the presence of an anionic catalyst of the type hereinafter set forth at relatively high pressures and reaction temperatures to form liquid polymers which possess desirable characteristics. Olefinic hydrocarbons which may be polymerized according to the process of this invention include monoolefinic hydrocarbons containing from 2 to about 8 carbon atoms per molecule and may be either linear or cyclic in nature, such olefins including straight chain monoolefins such as ethylene, propylene, 1-butene, 2-butene, 1-pentene, 2-pentene, 3-pentene, 1-hexene, 2-hexene, 3-hexene, 1-heptene, 2-heptene, 3-heptene, 4-heptene, 1-octene, 2-octene, 3-octene, 4-octene, etc.; and cyclic monoolefins such as cyclopentene, cyclohexene, cycloheptene, cyclooctene, norbornene, etc. Although the preferred reactions in this process comprise a polymerization of a single type of monoolefin, it is also contemplated within the scope of said invention that when certain structural modifications of the polymeric product are desired, such as the introduction of alkyl group branches on an essentially linear polymer molecule mixtures of the above olefins may be used. A particularly applicable illustration of this is the formation of lube oils of the type previously discussed, that is, a lube oil which consists of long aliphatic chains from which protrude one or two short side chains containing three or four carbon atoms in the chain. This type of lube oil could be obtained by copolymerizing large amounts of ethylene with relatively small amounts of propylene or butylene, the ethylene and propylene or butylene being copolymerized in a ratio of about 10 molecular proportions of ethylene per molecular proportion of butylene.

Catalysts which may be used in the process of this invention comprise alkali metal hydrides such as sodium hydride, potassium hydride, lithium hydride, rubidium hydride, and cesium hydride in the presence of an organic promoter, said promoters including polynuclear aromatic hydrocarbons such as naphthalene, anthracene, phenanthrene, chrysene, pyrene, triphenylene, etc.; diolefinic hydrocarbons such as 1,3-butadiene, 2-methyl-1,3-butadiene (isoprene), 1,3-pentadiene, 1,4-pentadiene, 1,3-hexadiene, 1,4-hexadiene, cyclopentadiene, cyclohexadiene, cycloheptadiene, etc.; halo and haloalkyl aromatic hydrocarbons such as chlorobenzene, bromobenzene, chlorotoluene, bromotoluene, 2-chloroethylbenzene, 2-bromoethylbenzene, etc.

Solvents which may be used in the process of this invention comprise aromatic hydrocarbons containing at least one benzylic hydrogen atom per molecule, such as toluene, ethylbenzene, cumene, o-xylene, m-xylene, p-xylene, cymene, indan, tetralin and diphenylmethane.

The process of the present invention will be effected at elevated temperatures and pressures, the temperature employed being in the range of from about 250° to about 350° C. and preferably in a range of from about 290° to about 325° C. The pressures to be used will range from about 65 to about 500 atmospheres or more, depending on the olefinic reactant, and preferably in a range of from about 200 to about 400 atmospheres. In order to maintain the desired pressure level while the reaction is proceeding it may be necessary to repeatedly repressurize the reaction vessel in order to increase the desired polymeric yield.

The process of this invention may be effected in any suitable manner and may comprise either a batch or a continuous type operation. For example, when a batch type operation is used a quantity of the catalyst comprising the alkali metal hydride and the organic promoter is placed in a reaction vessel along with the desired solvent. If the olefinic hydrocarbon to be polymerized is in liquid form it is added to the reaction vessel which is thereafter sealed. The necessary pressure may then be provided by introducing an inert gas such as nitrogen into said reaction vessel and thereafter slowly heating said vessel until the desired reaction temperature has been reached. The vessel and contents thereof are maintained at the desired reaction time for a predetermined residence time while maintaining the pressure at the desired level. At the end of the aforesaid period of time the reactor and contents thereof are allowed to cool to room temperature and the desired polymer is separated by filtration from the catalyst layer and subjected to fractional distillation to recover the desired polymer. If the monoolefinic hydrocarbon to be polymerized is in a normally gaseous state the catalyst, promoter and solvent are placed in a reaction vessel which is thereafter sealed and the olefin is pressed in until the desired pressure has been reached. If repressurizing of the reactor is required during the reaction time additional monoolefinic hydrocarbon may be pressed in to maintain said pressure at the desired level. At the end of the desired reaction time the reactor and contents thereof are cooled to room temperature and the reaction product is treated in a manner hereinbefore set forth.

The process of this invention may also be effected in a continuous type process. A particularly applicable form of continuous type process which may be used comprises a fixed bed type of operation in which the catalyst is positioned in the reaction zone as a fixed bed. The reaction zone may comprise an unpacked vessel or coil or may be lined with an adsorbent packing material such as fire brick, alumina, dehydrated bauxite, or the like, said zone being maintained at the proper operating conditions of temperature and pressure. The monoolefinic hydrocarbon to be polymerized is continuously charged to said zone in either a liquid or gaseous form. In addition the organic solvent and the organic promoter, if so desired, may be charged to said zone through separate lines or, if so desired, may be admixed with the monoolefinic hydrocarbon, if in liquid form, prior to entry into said zone and charged thereto in a single stream. As in the hereinbefore mentioned case when the monoolefinic hydrocarbon to be polymerized is in liquid form the necessary pressure in a continuous type operation may be supplied by an inert gas such as nitrogen. The desired polymer is continuously withdrawn from the reaction zone and separated from the reactor effluent, the latter being separated into its component parts and recycled to form a portion of the feed stock, while the former is subjected to treatment similar to that hereinbefore set forth and the desired polymer recovered.

Other types of continuous processes which may be used include the compact moving bed type of operation in which the catalysts and the reactants pass either concurrently or countercurrently to each other and the slurry type operation, to be used when the monoolefinic hydrocarbon is in liquid form, where the catalyst is carried into the reaction zone as a slurry in said monoolefinic hydrocarbon.

It is also contemplated within the scope of this invention that the polymer structure and the molecular weight distribution of the desired product may be modified by varying the catalyst and the promoter concentrations, by modifying the particular solvent which is used, or by introducing hydrogen in the initial charge at a relatively low pressure.

The following examples are given to illustrate the process of the present invention which, however, are not intended to limit the generally broad scope of the present invention in strict accordance therewith.

*Example I*

A catalyst comprising 8 g. of 54% sodium hydride dispersed in mineral oil and 1 g. of anthracene was placed in the glass liner of an 850 ml. rotating autoclave along with 60 g. of cumene. The liner was sealed in the autoclave and ethylene pressed in at an initial pressure of 65 atmospheres. The autoclave was then heated to a temperature of about 300° C. for a period of about 4 hours. The maximum pressure during this time rose to about 254 atmospheres. At the end of this period of time the autoclave and contents thereof were cooled to room temperature and the excess pressure was vented. The autoclave was opened and 49 g. of ethylene polymer ranging from a light lube oil to a soft waxy material was recovered.

*Example II*

In this example 9 g. of sodium hydride dispersion and 1 g. of anthracene were placed in the glass liner of a rotating autoclave along with 60 g. of cumene. The liner was sealed in the autoclave and ethylene pressed in at an initial pressure of 65 atmospheres. The autoclave and contents thereof were then heated to a temperature of about 300° C. for a period of about 4 hours, the maximum pressure rising to about 328 atmospheres. At the end of this time the autoclave and contents thereof were cooled to room temperature, the excess pressure was vented and 47 g. of ethylene polymer composed chiefly of lube oil-boiling range liquid accompanied by a minor amount of soft waxy liquid material along with an 8% yield of t-pentylbenzene based on the cumene were recovered.

Repetition of this reaction using n-decane in place of cumene afforded ethylene polymer containing much more high-boiling waxy material than lube-oil range distillate.

*Example III*

A charge consisting of 59.6 g. of toluene, 8.5 g. of sodium hydride dispersion and 1.1 g. of anthracene and 65 atmospheres initial ethylene pressure was heated in a manner similar to that set forth in Examples I and II, that is the mixture was placed in a glass liner of a rotating autoclave, the autoclave was sealed, the ethylene was charged thereto, following which the autoclave and contents thereof were heated to 300° C. and held there for about 4 hours. The maximum pressure in the rotating autoclave dropped from 338 to 238 atmospheres at 300° C. At the end of this time the autoclave and contents thereof were cooled to room temperature, the excess pressure was vented and the contents filtered and distilled. The yield of ethylene polymer consisting of a lube oil-boiling range liquid and a higher boiling, soft, waxy, viscous liquid amounted to 46 g. Little or no side-chain alkylate was isolated.

*Example IV*

In this experiment the catalyst comprising potassium hydride and naphthalene is placed in the glass liner of a rotating autoclave along with the organic solvent comprising ethylbenzene. The liner is sealed into the autoclave and the desired amount of propylene pressed in. The autoclave is then heated to a temperature of about 300° C. during a period of about 4 hours. At the end of this time the autoclave is cooled, the excess pressure is vented and the desired liquid polymer is separated and recovered.

*Example V*

Cyclohexene is polymerized by reacting said compound in the presence of a catalyst comprising sodium hydride and chlorobenzene in a solvent consisting of toluene at a temperature of 300° C. and a pressure ranging from 65 to about 200 atmospheres for a period of about 4 hours. At the end of this time the desired polymer is separated and recovered.

*Example VI*

To determine the desirable characteristics of the lube oil which was prepared in Examples I and II the reaction product was treated to separate the liquid polymer from a minor amount of accompanying soft, waxy solid. The lube oil which was recovered was then subjected to analysis with the following results:

[Boiling range—300° to 500° C. Molecular weight—406]

| 100° F. | | 210° F. | |
|---|---|---|---|
| Kin. Visc., cst. | Univ. Visc., sec. | Kin. Visc., cst. | Univ. Visc., sec. |
| 26.21 | 125 | 4.874 | 42.2 |
| After removal of aromatics | | | |
| 24.9 | 119 | 4.85 | 42.2 |
| After removal of aromatics and with the additon of 10% of a viscosity index improver | | | |
| 57.84 | 268.1 | 13.27 | 71.3 |

| | |
|---|---|
| Viscosity index of original lube oil | 122.4 |
| Viscosity index after removal of aromatics | 132.5 |
| Viscosity index after removal of aromatics plus 10% viscosity index promoter | 159.1 |

*Example VII*

A series of 4 reactions was carried out under the conditions described in Example I in order to demonstrate that the small amounts of mineral oil present in the sodium hydride dispersion have negligible effect on the physical properties of the lube oil product. The charge to the autoclave was the same as in Example I except that the sodium hydride dispersion was washed essentially free of mineral oil dispersant by decantation with benzene, the last quantities of which were replaced with cumene. The combined product fractions boiling in the lube oil range (300–500° C.) were separated from small amounts of waxy material and then chromotographed on silica gel to remove a minor amount of aromatics. The aromatic-free product was found to have the following physical properties:

| 100° F. | | 210° F. | |
|---|---|---|---|
| Kin. Visc., cst. | Univ. Visc., sec. | Kin. Visc., cst. | Univ. Visc., sec. |
| 18.83 | 92.9 | 4.022 | 39.5 |

| | |
|---|---|
| Viscosity index after removal of aromatics | 130.5 |

I claim as my invention:

1. A process for producing liquid polymer boiling in the lubricating oil range by the polymerization of a mono-olefinic hydrocarbon of from 2 to about 8 carbon atoms per molecule, which comprises forming a reaction mixture of said hydrocarbon, a mononuclear alkylbenzene solvent containing at least one benzylic hydrogen atom or molecule, an alkali metal hydride and a polynuclear aromatic promoter, subjecting said mixture to reaction at a temperature of from about 250° to about 350° C. and a pressure of from about 65 to about 500 atmospheres, and recovering resultant liquid polymer.

2. The process of claim 1 further characterized in that said promoter is a polynuclear aromatic hydrocarbon.

3. The process of claim 1 further characterized in that said promoter is naphthalene.

4. The process of claim 1 further characterized in that said promoter is anthracene.

5. The process of claim 1 further characterized in that said mono-olefinic hydrocarbon is ethylene.

6. The process of claim 1 further characterized in that said mono-olefinic hydrocarbon is propylene.

7. The process of claim 1 further characterized in that said mono-olefinic hydrocarbon is cyclohexene.

8. The process of claim 1 further characterized in that said solvent comprises cumene.

References Cited in the file of this patent

UNITED STATES PATENTS

| | | |
|---|---|---|
| 2,492,693 | Freed | Dec. 27, 1949 |
| 2,791,575 | Feller et al. | May 7, 1957 |
| 2,829,136 | Fotis et al. | Apr. 1, 1958 |
| 2,912,422 | Fotis et al. | Nov. 10, 1959 |